United States Patent [19]

Dickinson

[11] E Patent Number: Re. 33,201

[45] Reissued Date of Patent: Apr. 17, 1990

[54] HYDRAULIC SAFETY BARRIER TRAFFIC-WAY CONTROLLER

[76] Inventor: Harry D. Dickinson, 1551 Melwood Dr., Glendale, Calif. 91207

[21] Appl. No.: 842,223

[22] Filed: Mar. 21, 1986

Related U.S. Patent Documents

Reissue of:

[64] Patent No.: 4,490,068
Issued: Dec. 25, 1984
Appl. No.: 488,106
Filed: Apr. 25, 1983

[51] Int. Cl.[4] ..... E01F 13/00

[52] U.S. Cl. ..... 404/6; 49/33; 49/49; 49/131; 49/133; 49/265; 404/9; 244/110 C; 244/110 F

[58] Field of Search ..... 404/6, 9; 49/33, 49, 49/131, 133, 265; 256/1, 13.1; 188/32; 104/252, 256; 244/110 C, 110 F; 91/443, 447

[56] References Cited

U.S. PATENT DOCUMENTS

| | | | |
|---|---|---|---|
| 533,894 | 2/1895 | Hill | 104/256 |
| 1,590,260 | 6/1926 | Smith | 49/265 X |
| 2,187,513 | 1/1940 | Evans | 49/49 X |
| 2,327,366 | 8/1924 | Nampa | 49/49 |
| 2,330,739 | 9/1943 | Piron | 60/418 X |
| 2,362,912 | 11/1944 | Logan, Jr. | 49/33 X |
| 3,044,764 | 7/1962 | Bonner | 49/265 X |
| 3,113,432 | 12/1963 | Watson | 91/443 X |
| 3,168,010 | 2/1965 | Thomas | 91/447 X |
| 3,308,496 | 3/1967 | Mooney et al. | 14/36 |
| 3,395,779 | 8/1968 | Foster, Jr. | 188/32 |
| 3,433,131 | 3/1969 | Söyland et al. | 91/447 |
| 3,587,233 | 6/1971 | Fischbach | 60/418 X |
| 3,587,639 | 6/1971 | Namiki | 91/443 X |
| 3,626,637 | 12/1971 | Rudicel | 49/49 X |
| 3,724,333 | 4/1973 | Fonden et al. | 244/110 F |
| 3,869,104 | 3/1975 | Gallo | 244/110 C |
| 3,875,850 | 4/1975 | Reynolds et al. | 91/447 X |
| 3,976,158 | 8/1976 | Shaffer | 60/418 X |
| 4,004,857 | 1/1977 | Eschen, Jr. | 404/6 |
| 4,152,871 | 5/1979 | Kardash, Jr. | 49/49 |
| 4,202,373 | 5/1980 | Hargraves et al. | 137/625.65 X |
| 4,204,459 | 5/1980 | Johnson | 91/447 X |
| 4,278,403 | 7/1981 | Shafer | 60/418 X |
| 4,317,332 | 3/1982 | Schubert | 60/418 X |
| 4,325,307 | 4/1982 | Bick | 104/256 |
| 4,332,503 | 6/1982 | Hurst, Jr. | 404/11 |
| 4,512,260 | 4/1985 | Manning, Jr. et al. | 104/252 |

FOREIGN PATENT DOCUMENTS

| | | | |
|---|---|---|---|
| 983441 | 2/1965 | United Kingdom | 404/6 |

OTHER PUBLICATIONS

Parker-Hannifin Corporation, Fluid Power 1, 1977, pp. 2-1 to 2-7, 9-1 to 9-10, 11-1 to 11-9.

Parker-Hannifin Corporation, Fluid Power Design Engineers Handbook, 1973, pp. a-3 to a-6, K(c-3).

Womack Machine Supply Company, Industrial Fluid Power, 1978, pp. 162-174, 155.

*Primary Examiner*—Jerome W. Massie
*Assistant Examiner*—Matthew Smith
*Attorney, Agent, or Firm*—William H. Maxwell

[57] ABSTRACT

A vehicle traffic-way controller of retractile barrier configuration wherein activation and control is by hydraulics in the form of a pressure source applied from a motor driven pump and directed by a valve to opposite ends of a double acting cylinder and piston actuator to extend and retract the barrier, there being switch control with positive positioning of the barrier and with impact absorbing protection for the hydraulics and structure.

9 Claims, 3 Drawing Sheets

A
C
10
12
13
14
14'
15
15'
8
4/3"

FIRST EMBODIMENT

SECOND EMBODIMENT

"THIRD EMBODIMENT"

"FOURTH EBODIMENT"

HYDRAULIC SAFETY BARRIER TRAFFIC-WAY CONTROLLER

Matter enclosed in heavy brackets [ ] appears in the original patent but forms no part of this reissue specification; matter printed in italics indicates the additions made by reissue.

BACKGROUND

Traffic controllers are utilized as intimidating devices that preclude traffic of autos and the like at the entrances and exits of parking lots and like facilities. That is, a visible barrier is presented at the pavement level so as to permit the desired traffic flow by means of its retraction, and to prevent unauthorized traffic by means of its raised and visible configuration in the form of a projecting curb or the like of substantial height. The curb configuration is menacing when projecting above the pavement level, and can be the cause of damage to the tires and to the undercarriage of vehicles attempting to encroach over the said barrier curb. The curb configuration of the controller is essentially a barrier that is substantially impassible by wheeled vehicles, and it is [rugged] massive. Consequently, rapid operation becomes a problem with respect to power requirements related to acceleration and deceleration, when operating the controller from closed to open conditions and vise versa. It is a general object of this invention therefore, to provide economical rapid actuation of a safety barrier of the curb type in a traffic-way controller.

The traffic-way controller as it is disclosed herein is a massive curb that extends from and retracts into the surface of a traffic-way, and it is characterized by a flat surface coplanar with the traffic-way when retracted, and by a sharply inclined surface made thereby when raised or extended. The curb is hinged and in the nature of a hatch door pivoted to a *buried* [burried] frame to be operated from a complementary opening therein. It is an object of this invention to rapidly extend and retract said massive curb by means of a fluid pressure source applied directly between the curb and frame and responsive to a valve control to extend and to retract the curb. In its basic form the fluid pressure source is applied directly from a demand motor driven pump means and directed by a four-way two position valve means to opposite ends of a double acting cylinder and piston means so as to extend and retract the curb as required. In another form, the fluid pressure source is applied directly from a continuously operated motor driven pump means and directed by a four-way three position valve means to opposite ends of a double acting cylinder and piston means, with a center by-pass condition for free flow when the curb is either extended or retracted. With the demand and continuous motor driven pump concepts the velocity of curb movement between the extended and retracted positions is dependent entirely upon the power of the motor and pump capacity, a limiting factor when economizing in the selection of these pressure source components. Therefore, it is an object of this invention to improve upon the pure kinetic power source and substitute therefor a potential energy pressure source, whereby the power and pumping capacities of the motor and pump components can be substantially reduced and minimized. In the improved form the fluid pressure source is reestablished upon demand as potential energy and at a rate that will meet the demand of normal intermittent operation of the curb barrier.

The actuation of the curb between extended and retracted positions is by fluid actuation, it being an object to minimize power as well as pump rate requirements. With the present invention, a fluid pressure accumulator is employed, and wherein liquid is stored between predetermined high and low pressure levels, as potential energy. For example, an actual reduction to practice involves cylinder and piston actuators that require nine gallons per minute of liquid volume, with a cycle operation requirement of four and one half movements per minute. Consequently, two gallons per minute pumping rate is all that is required, and in practice this is accomplished up to 1500 p.s.i. with a two horse power motor that operates intermittenly upon demand, dependent upon the frequency of extension and retraction of the curb. A high-low pressure sensor automatically controls operation of the motor-pump means.

It is also an object of this invention to provide for positive movement and positioning of the curb barrier, and to this end there is fluid restriction on the discharge of hydraulic fluid back to a reservoir. Since the hydraulic fluid, liquid, is substantially incompressible the depression forces upon the curb [as they may be] *by* caused impact are positively checked. However, it is also an object to absorb and dissipate high energy shock or impact pulses, and to this end said restriction and discharge to the reservoir is by a flow restrictor and pressure relief means with a by-pass return to said reservoir. In practice, this flow restrictor is also adjustable for determining the rate of movement imparted to the curb barrier.

The hydraulic safety barrier traffic-way controller of the present invention is electrically controlled by a solenoid actuated valve, and with limit switches and/or UP and DOWN switches, as will be described. With the basic demand flow form of this invention there are limit switches to control the motor-pump means, with UP and DOWN switching to position the direction valve. With the continuously operating motor-pump means embodiment there is UP and DOWN switching with a center dump position of the direction valve. With the improved potential energy embodiment there is simply an UP and DOWN switching, utilizing an inexpensive four-way two position valve, while the pressure source is automatically maintained as a potential to meet the operational demand of cycle frequency.

SUMMARY OF THE INVENTION

This invention relates to a traffic-way controller of the curb barrier type and the like, wherein massive curb or like member are extended and retracted from the plane of a driveway. The purpose of this invention is to provide for the positive and rapid controlled rate of operation of the curb barrier, and to this end hydraulics is employed with positive regulated pressure application and with shock damping and *relief* [releif] of pressure that accommodate abnormal impacts reflected as pressure pulses in the system. However, and an object is to recover from impact conditions, and with a system that is instantaneously *reversible* [reverable] . Consequently, the equipment is virtually immune to damage, within reason determined by structural design, and it is entirely safe with respect to the reasonable observer as it is characterized by smooth exterior walls throughout and without dangerous projection. The motor-pump means is low cost due to its minimized pumping requirements, and the potential of operation is automatic with inherent shock absorbing features conductive to safety in addition to protection afforded to the equipment.

The foregoing and various other objects and features of this invention will be apparent and fully understood from the following detailed description of the typical preferred form and application thereof, throughout which description reference is made to the accompanying drawings.

THE DRAWINGS

Figure 7:
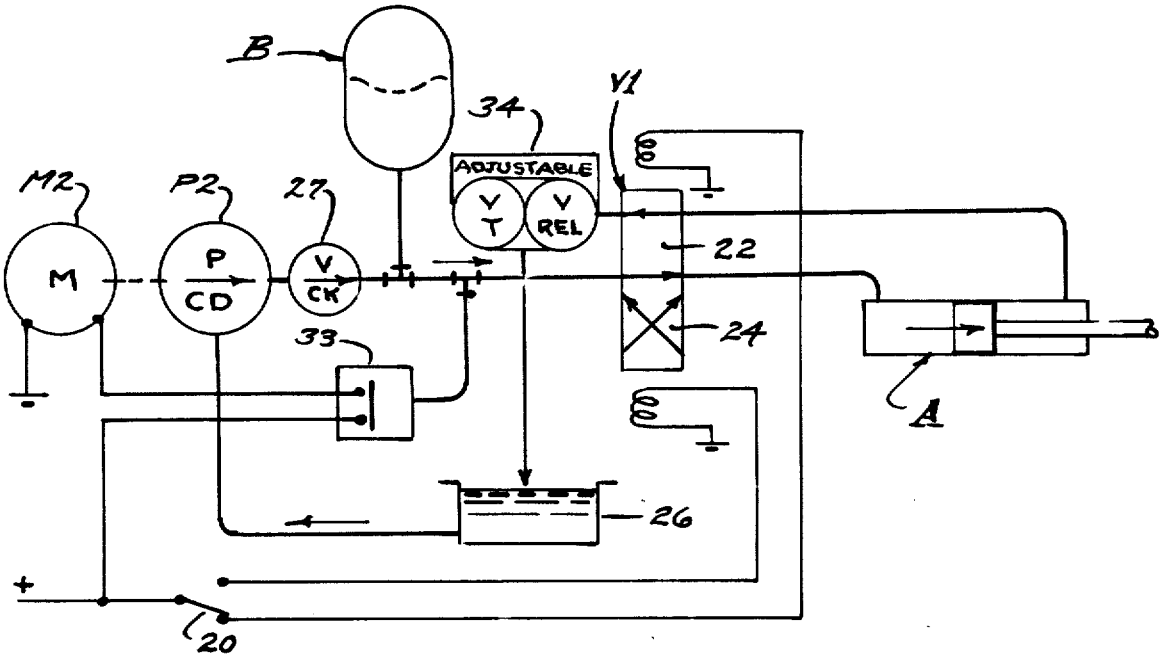

And, FIG. 7 is schematic diagram of the electro-hydraulic controller in fourth and preferred embodiment.

PREFERRED EMBODIMENT

Figures 1, 2, 3:
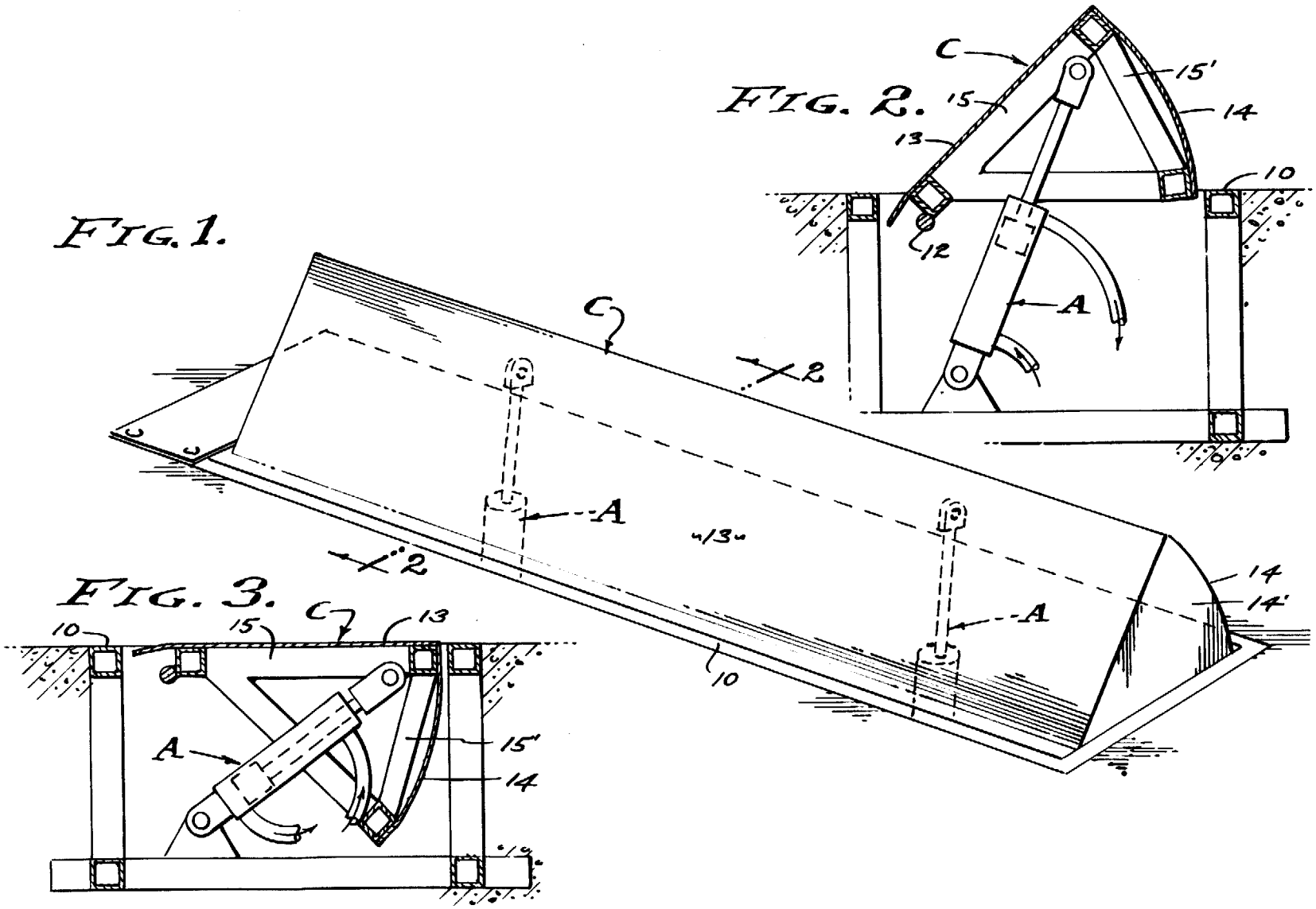
FIG. 1 is a perspective view of a traffic-way barrier and actuators therefor to be controlled by the controller of the present invention.
FIG. 2 is an enlarged transverse sectional view taken as indicated by line 2—2 on FIG. 1, showing the barrier in the UP position.
FIG. 3 is an enlarged transverse sectional view similar to FIG. 2, showing the barrier in the DOWN position.

Referring now to FIG. 1 of the drawings, this traffic-way controller is a heavy barrier that is retractile, characterized by its normally upstanding teeth or curb C which is operable within a frame 10 and dretractile within said frame installed in a foundation pit of concrete or the like. The curb per se is a flat plate that revolves on hinge pins 12 disposed transversely of a traffic-way to rise angularly to an obstructive position and alternately to retract to a coplanar position occupying a rectangular opening in the frame. The frame 10 is a weldment of tube members, and is of sufficient depth to accomodate one or more cylinder and piston actuators A of double action type to raise and to lower the hinged curb C.

The curb C is a reinforced planar element having a tube frame weldment carrying a flat surface member 13 and a depending closure skirt 14 of semi-cylinder form that closely follows the opening edge in the frame 10. In practice, the normal raised position of the surface member 13 is approximately 45°, and its retracted position is coplanar with the topsurfaces of the retangular frame opening members. The surface member 13 is carried by a rectangular frame 15 pivoted on the hinge pins 12. Depending at 45° from hinge pins 12 to the skirt 14 there is a strut 15'. The peripheral tube members of frame 15 and strut 15' being parallel and at an equal radius with flat peripheral faces to which the top and bottom margins of the skirt 14 are attached. The arcuate segmental space at opposite ends of the strut frame 15' are closed by segment shaped walls 14'. The cylinder and piston actuators A operate between the base of frame 10 and the top peripheral tube member of hinged frame 15. In practice, there is a pair of cylinder and piston actuators A to positively lift and to positively retract the curb C.

Figure 4:
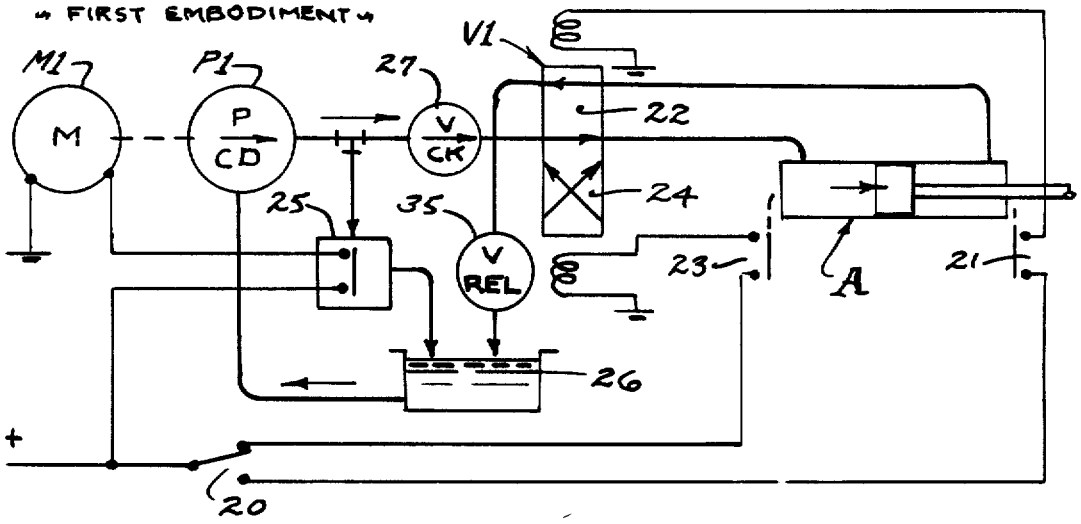
FIG. 4 is a schematic diagram of the electro-hydraulic controller in a first embodiment.

In FIG. 4 of the drawings, I have shown the intermittent running form of traffic-way control with hydraulic actuation in the form of a fluid pressure source applied kinetically from a demand motor driven pump means and directed by a four-way two-position valve means to opposite ends of a double acting cylinder and piston actuator A, so as to extend and retract the curb C through the application of positive fluid pressure. This is a demand flow embodiment with an UP-DOWN selector switch or switches 20 shown having double throw contacts in series with an UP limit switch 21 positioning valve V1 as shown at 22, and with a DOWN limit switch 23 positioning valve V1 as shown at 24. The limit switches 21 and 23 drop the valve positions 22 and 24 (solenoids) so that valve V1 remains in alternate positions as indicated. A motor M1 drives a positive displacement pump P1 for full volume flow and with a pressure relief by-pass and pressure switch means 25 in the delivery line thereof, to stop the motor M1 and to return excess fluid to a reservoir 26 at the end of either the up or down stroke of the cylinder and piston actuator A. As shown, a check valve 27 protects the pump P from hydraulic impact and secures the piston in either the extended or retracted positions.

Figure 5:
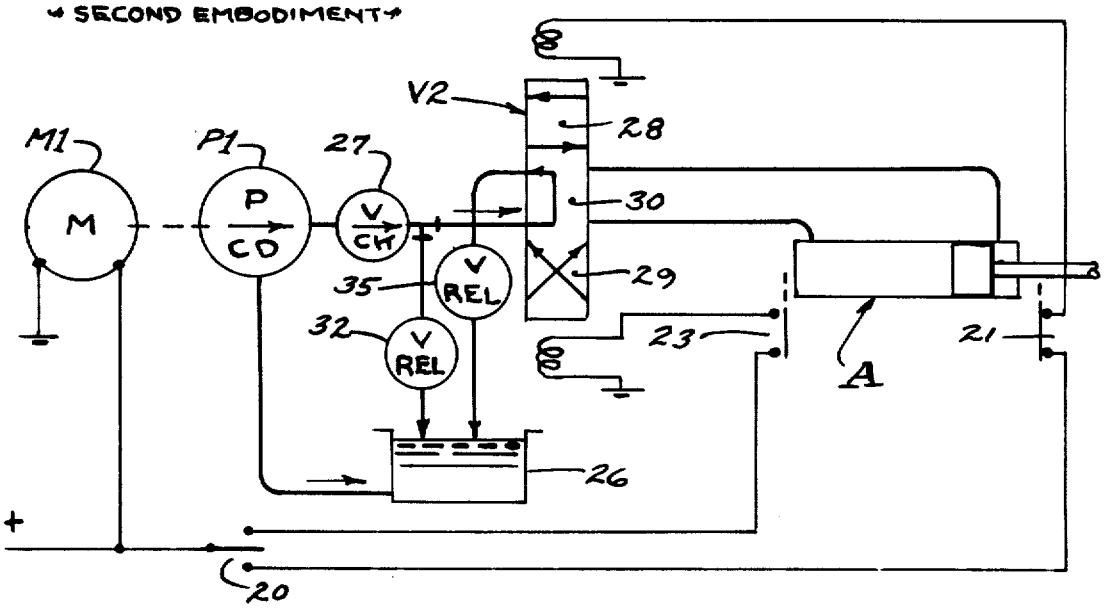
FIG. 5 is a schematic diagram of the electro-hydraulic controller in a second embodiment.

In FIG. 5 of the drawings, I have shown the continuous running kinetic energy form of traffic-way control with hydraulic actuation in the form of a fluid pressure source applied from a full power motor driven pump means and directed by a four-way three-position valve means to opposite ends of a double acting cylinder and piston actuator A and alternately to a reservoir 26, so as to extend and retract the curb C through the application of positive fluid pressure. This is a return flow embodiment with an UP-DOWN selector switch or switches 20 shown having double throw contacts in series with an UP limit switch 21 positioning valve V2 as shown at 28, and with a DOWN limit switch 23 positioning valve V2 as shown at 29. A motor M1 drives a positive displacement pump P1 for full volume flow and with a pressure relief by-pass valve means 32 in the delivery line thereof to return by-pass fluid to a reservoir when the piston receives impact or resists movement during either stroke. When the limit switches 21 and 23 are opened, the valve V2 positions 28 and 29 (solenoids) are dropped, and the valve V2 centers at position 30 for return flow to the reservoir 26. As shown, a check valve 27 protects the pump P1 from hydraulic impact and secures the piston in either the extended or retracted positions subject to the relief valve means 32 that returns any impact fluid to reservoir 26.

Figure 6:
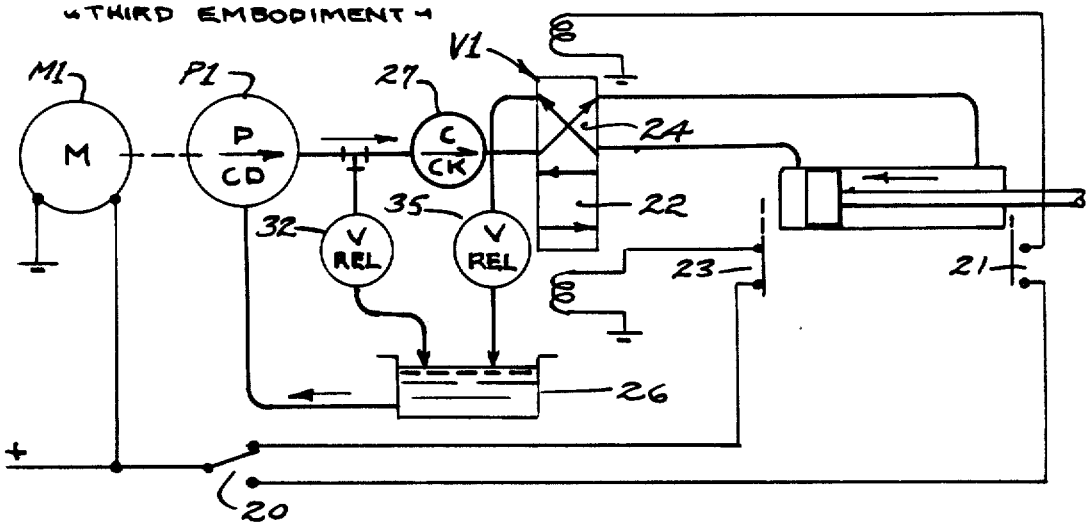
FIG. 6 is a schematic diagram of the electro-hydraulic controller in a third embodiment.

In FIG. 6 of the drawings, I have shown the continuous running kinetic energy form of traffic-way control with hydraulic actuation in the form of a fluid pressure source applied from a full power motor driven pump means and directed by a four-way two-position valve means to opposite ends of a double action cylinder and piston actuator A, so as to extend and retract the curb C through the application of positive fluid pressure. This is a by-pass flow embodiment with an UP-DOWN selector switch or switches 20 shown having double throw contact in series with an UP limit switch 21 positioning valve V1 as shown at 22, and with a DOWN limit switch 23 positioning valve V1 as shown at 24. The limit switches 21 and 23 drop the valve positions 22 and 24 (solenolds) so that valve V1 remains in alternate positions as indicated. A motor M1 drives a positive displacement pump P1 for full volume flow and with a pressure relief by-pass valve means 32 in the delivery line thereof to return by-pass fluid to a reservoir 26 when the piston is at the end of either the up or down stroke of the cylinder and piston actuator A. As shown, a check valve 27 protects the pump P1 from hydraulic impact and secures the piston in either the extended or retracted position.

In FIG. 7 of the drawings, I have shown the intermittent running potential energy form of traffic-way control with hydraulic actuation in the form of a fluid pressure source applied from a time-demand reduced power motor driven pump means and directed by a four-way two-position valve means from a pressure-volume accumulator to opposite ends of a double acting cylinder and piston actuator A, so as to extend and retract the curb C through the application of positive fluid pressure with impact absorbing capability. This is a pressure-volume accumulation and impact absorbing embodiment with an UP-DOWN selector switch or switches 20 shown having double throw contacts with an UP position solenoid positioning the valve V1 as shown at 22, and with a DOWN position solenoid positioning the valve V1 as shown at 24. The UP and DOWN switch contact can hold the solenoids *operated* [oeprated], directly or indirectly by relay means, or the UP and DOWN contacts can be made instantaneously and positions held by friction or detent action (not shown).

A Motor M2 drives a positive displacement pump P2, in this fourth embodiment now under consideration, both of substantially reduced capacity compared with the full volume motor and pump means hereinabove described in the first three embodiments. In practice, the power reduction ratio is 4 ½ to 1 based upon an operational requirement of four and one half piston strokes per minute, and for example a pair of cylinder and piston actuators A as shown herein require nine gallons per minute for such continuous operation, in which case a two gallon per minute rate is required in this embodiment with the use of pressure-volume accumulator B. In practice, a two horse power motor M2 and a two gallon per minute pump P2 are employed and operated intermittently upon demand responsive to a high-low switch 33 that senses accumulator pressure proportionate to volume therein.

In this fourth embodiment now under consideration, the motor M2 of comparative time-demand power drives the positive displacement pump P2 of a complementary and comparative time-demand capacity for reduced volume flow of increasing pressure into the accumulator B through a check valve 27 that protects the pump P2 from hydraulic impact and secures the piston in either the extended or retracted position. The pressure-volume accumulator B employed in this embodiment is a gas charged accumulator of two and one half gallons capacity, with a diaphragm as indicated, and is operated between 300 lbs. and 1500 lbs. pressure per square inch and connected into the delivery line to valve V2. In accordance with this invention, the high-low switch 33 is open hydraulically to the accumulator pressure so as to sense the pressure-volume condition thereof, and operates to close the energizing circuit to motor M2 at said 300 lbs. pressure, and to open the energizing circuit to motor M2 at said 1500 lbs. pressure.

A feature of this fourth embodiment is the uniform speed control and impact absorbing at variable pressure, to the piston of the cylinder and piston actuators A, by the inclusion of an adjustable flow regulating pressure relief valve 34 in the return line from valve [V2] *V1* to the reservoir 26. Accordingly, the relief valve 34 protects the hydraulic system and structure from impacts imposed to lift the curb C, while the above described accumulator protects the hydraulic system and structure from impacts imposed to depress the curb C. Still further, the valve 34 is primarily an adjustable flow regulator and thereby controls and establishes a uniform rate of movement regardless of variations in fluid supply pressure from the accumulator B. Accordingly, the velocity at which the curb C moves when extended or retracted is adjustable to remain substantially uniform and the same between the low supply pressure of 300 p.s.i to the high supply pressure of 1500 p.s.i. The regulating pressure relief valve 34 serves multi purposes; firstly speed control, secondly impact absorbing, and thirdly positively prevents retraction with a set pressure limit of the piston in either the up or down mode.

From the foregoing it will be seen that the four embodiments disclosed have the common attributes of quick safe-sure operation. In the kinetic full power form, either a two-position or three-position valve is employed with limit switches to shut off fluid to the cylinder at each end of a piston stroke. In the first described intermittent demand embodiment of FIG. 4, the pump motor is shut off by the pressure switch responsive to a pressure build-up at the end of each stroke, controlled by the two position valve, and the pump is protected by the check valve and the actuator is protected by a relief valve 35 with a return to the reservoir. In the second described continuous return flow embodiment of FIG. 5, the pump is by-passed by the center position of the three position valve so that there is no pressure build-up, and the pump is protected by the check valve and the actuator is protected by a relief valve 35 with a return to the reservoir. In the third described continuous flow by-pass embodiment of FIG. 6, a pressure relief by-pass valve returns unused fluid to the reservoir, and the cylinder and piston actuator is controlled by the two-position valve, and the pump is protected by the check valve and the actuator is protected by a relief valve 35 with a return to the reservoir. In the improved fourth described intermittent potential energy embodiment of FIG. 7, the supply of fluid at varied pressure is on a time-demand basis sensed by the high-low pressure switch control over the motor-pump means, and with velocity of the barrier movement controlled by the adjustable pressure regulating pressure relief valve, and the potential energy stored by the [acculator] *accumulator* having a volume complementary to the time cycle demand requirements. The last described embodiment is *sure-safe* [sur-safe] and most economical. Having described only a typical preferred form and application of my invention, I do not wish to be limited or restricted to the specific details herein set forth, but wish to reserve to myself any modifications or variations that may appear to those skilled in the art as set forth within the limits of the following claims.

I claim:

[1. A self contained vehicle traffic-way controller of retractile barrier configuration subject to upward and downward impacts and wherein actuation and control is by instantly reversible hydraulics, and including;

a barrier disposed across a traffic-way and pivoted to a frame for extension through intermediate positions to an UP position projecting as an abutment exposed to impact in the traffic-way and to a DOWN position substantially coplanar with the traffic-way, at least one double acting cylinder and piston actuator connected between the barrier and frame and operable between a normally extended UP position of the barrier and a retracted DOWN position of the barrier, an intermittent running motor driven pump means supplying fluid from a reservoir at a variable pressure and a volume rate complementary to the time-demand requirement of said at least one cylinder and piston actuator, a pressure-volume accumulator open into a supply line from the motor driven pump means and storing potential energy as fluid volume under low to high pressure, an instantly reversible valve means in a supply line between the pressure-volume accumulator and the cylinder and piston actuator and having two controlled operating positions, an UP position pressuring a lower end and exhausting an upper end of the actuator and extending said actuator, and a DOWN position pressuring the upper end and exhausting the lower end of the actuator and retracting said actuator, a high-low pressure switch open to and responsive to accumulator pressure to close an energizing circuit to the motor at a predetermined low accumulator pressure and to open the energizing circuit at a predetermined high accumulator pressure thereby maintaining a variable pressure and proportionate volume of fluid in the accumulator, a check valve in and preventing reverse flow in the supply line between the motor driven pump means and the pressure-volume accumulator to hold a fluid volume in the accumulator for yielding to retraction of the actuator when moving and when held to said UP position to protect both the actuator and pump and related structure from hydraulic impact, and control means switching the valve means alternately into said UP and DOWN positions.]

[2. The vehicle traffic-way controller as set forth in claim 1, wherein the valve means discharges into a return to the reservoir from the cylinder and piston actuator when in either of said UP and DOWN positions, there being a pressure relief valve means in the return to the reservoir for yielding to retraction of the actuator from said UP and DOWN positions and thereby protect the actuator from hydraulic impact.]

[3. The vehicle traffic-way controller as set forth in claim 1, wherein the valve means discharges into a return line to the reservoir from the cylinder and piston actuator, there being a flow regulating valve means in the return line to the reservoir for controlling retraction of the actuator from said UP and DOWN positions and thereby protect the actuator from hydraulic impact.]

[4. The vehicle traffic-way controller as set forth in claim 1, wherein the valve means discharges into a return line to the reservoir from the cylinder and piston actuator, there being a flow regulating pressure relief valve means in the return line to the reservoir for permitting controlled retraction of the actuator from said UP and DOWN positions and thereby protect the actuator from hydraulic impact.]

[5. The vehicle traffic-way controller as set forth in claim 1, wherein the valve means discharges into a return line to the reservoir from the cylinder and piston actuator, there being an adjustable flow regulating pressure relief valve means in the return line to the reservoir for permitting controlled retraction of the actuator from said UP and DOWN positions and thereby protect the actuator from hydraulic impact.]

[6. The vehicle traffic-way controller as set forth in claim 1, wherein the valve means is a four-way two-position valve with solenoid means responsive to the control means to alternately switch flow of fluid from the supply line to opposite ends of the cylinder and piston actuator with the exhaust fluid therefrom to the reservoir, whereby fluid is trapped in the cylinder to positively hold said UP and DOWN positions.]

[7. The vehicle traffic-way controller as set forth in claim 1, wherein the control means includes a selector switch contact for said UP position of the valve means, and alternately a selector switch contact for said DOWN position of the valve means.]

[8. The vehicle traffic-way controller as set forth in claim 1, wherein the valve means is a four-way two-position valve with with solenoid means responsive to the control means to alternately switch flow of fluid from the supply line to opposite ends of the cylinder and piston actuator with the exhaust fluid therefrom to the reservoir, whereby fluid is simultaneously trapped in the cylinder to positively hold said UP and DOWN positions, wherein the valve means discharges into a return line to the reservoir from the cylinder and piston actuator, there being an adjustable flow regulating pressure relief valve means in the return line to the reservoir for permitting controlled retraction of the actuator from said UP and DOWN positions and thereby protect the actuator from hydraulic impact, and wherein the control means includes a selector switch contact for said up position of the valve means, and alternately a selector switch contact for said DOWN position of the valve means.]

[9. The vehicle traffic-way controller as set forth in claim 1, wherein a pressure relief valve means in a return line from the actuator to the reservoir yields to retraction of the actuator from said UP and DOWN positions and thereby protects the actuator from hydraulic impact.]

*10. A self contained vehicle traffic-way controller of retractile barrier configuration subject to upward and downward impacts and wherein actuation and control is by reversible hydraulics, and including;*

*a barrier disposed across a traffic-way and pivoted to a frame for extension through intermediate positions to an UP position projecting as an abutment exposed to impact in the traffic-way and to a DOWN position substantially coplanar with the traffic way,*

*at least one double acting cylinder and piston actuator connected between the barrier and frame and operable between a normally extended UP position of the barrier and a retracted DOWN position of the barrier,*

*an intermittent running motor driven pump means supplying hydraulic fluid from a reservoir at a variable pressure and a volume rate complementary to the time-demand requirement of said at least one cylinder and piston actuator,*

*a pressure-volume accumulator open into a hydraulic fluid supply line from the motor driven pump means and storing potential energy as fluid volume under low to high pressure,*

*a reversible valve means in the supply line between the pressure-volume accumulator and the cylinder and piston actuator and having only two controlled operating positions, an UP position pressuring a first end and exhausting a second end of the actuator and extend-*

*ing said actuator, and a DOWN position pressuring the second end and exhausting the first end of the actuator and retracting said actuator, there being a return line from the valve means to the reservoir, and said valve means being normally open to and maintaining uninterrupted communication of hydraulic fluid between said accumulator and said cylinder and piston actuator in either said UP or DOWN position,*

*a high-low pressure switch open to and responsive to accumulator pressure to close an energizing circuit to the motor at a predetermined low accumulator pressure and to open the energizing circuit at a predetermined high accumulator pressure thereby maintaining a variable pressure and proportionate volume of fluid in the accumulator,*

*a check valve in and preventing reverse flow in said hydraulic fluid supply line between the motor driven pump means and the pressure-volume accumulator to hold a fluid volume in the accumulator to protect both the actuator and pump and related structure from hydraulic impact,*

*and control means switching the valve means alternately into said UP and DOWN positions.*

*11. The vehicle traffic-way controller as set forth in claim 10, wherein the valve means discharges into the return line to the reservoir from the cylinder and piston actuator when in either of said UP and DOWN positions, there being a pressure relief valve in the return line to the reservoir to protect the actuator from hydraulic impact.*

*12. The vehicle traffic-way controller as set forth in claim 10, wherein the valve means discharges into the return line to the reservoir from the cylinder and piston actuator, there being a flow regulating valve means in the return line to the reservoir for controlling retraction of the actuator from said UP and DOWN positions and thereby protect the actuator from hydraulic impact.*

*13. The vehicle traffic-way controller as set forth in claim 10, wherein the valve means discharges into the return line to the reservoir from the cylinder and piston actuator, there being a flow regulating pressure relief valve means in the return line to the reservoir for permitting controlled retraction of the actuator from said UP and DOWN positions and thereby protect the actuator from hydraulic impact.*

*14. The vehicle traffic-way controller as set forth in claim 10, wherein the valve means discharges into the return line to the reservoir from the cylinder and piston actuator, there being an adjustable flow regulating pressure relief valve means in the return line to the reservoir for permitting controlled retraction of the actuator from said UP and DOWN positions and thereby protect the actuator from hydraulic impact.*

*15. The vehicle traffic-way controller as set forth in claim 10, wherein the valve means is a four-way two-position valve with a solenoid means responsive to the control means to alternately switch flow of fluid from the supply line to opposite ends of the cylinder and piston actuator with the exhaust fluid therefrom to the reservoir, whereby fluid is trapped in the cylinder to positively hold said UP and DOWN positions.*

*16. The vehicle traffic-way controller as set forth in claim 10, wherein the control means includes a selector switch contact for said UP position of the valve means, and alternately a selector switch contact for said DOWN position of the valve means.*

*17. The vehicle traffic-way controller as set forth in claim 10, wherein the valve means is a four-way two-position valve with solenoid means responsive to the control means to alternately switch flow of fluid from the supply line to opposite ends of the cylinder and piston actuator, whereby fluid is simultaneously trapped in the cylinder to positively hold said UP and DOWN positions, wherein the valve means discharges into the return line to the reservoir from the cylinder and piston actuator, there being an adjustable flow regulating pressure relief valve means in the return line to the reservoir for permitting controlled retraction of the actuator from said UP and DOWN positions and thereby protect the actuator from hydraulic impact, and wherein the control means includes a selector switch contact for said UP position of the valve means, and alternately a selector switch contact for said DOWN position of the valve means.*

*18. The vehicle traffic-way controller as set forth in claim 10, wherein a pressure relief valve means in the return line from the actuator to the reservoir yields to retraction of the actuator from said UP and DOWN positions and thereby protects the actuator from hydraulic impact.*

* * * * *